(12) United States Patent
Zhu et al.

(10) Patent No.: US 9,250,369 B2
(45) Date of Patent: Feb. 2, 2016

(54) METHOD OF MANUFACTURING HOLLOW-STRUCTURE METAL GRATING

(71) Applicants: Tsinghua University, Beijing (CN); HON HAI PRECISION INDUSTRY CO., LTD., New Taipei (TW)

(72) Inventors: Zhen-Dong Zhu, Beijing (CN); Qun-Qing Li, Beijing (CN); Ben-Feng Bai, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/262,809

(22) Filed: Apr. 28, 2014

(65) Prior Publication Data

US 2015/0087153 A1 Mar. 26, 2015

(30) Foreign Application Priority Data

Sep. 22, 2013 (CN) .......................... 2013 1 0429909

(51) Int. Cl.
*H01L 21/311* (2006.01)
*G02B 5/18* (2006.01)

(52) U.S. Cl.
CPC ............ *G02B 5/1809* (2013.01); *G02B 5/1857* (2013.01); *G02B 5/1861* (2013.01)

(58) Field of Classification Search
CPC ..................... H01L 21/02658; H01L 21/0273; H01L 21/0338; H01L 21/31058; H01L 21/31144; H01L 27/12; H01L 31/0693; H01L 2924/01079; H01L 45/124
USPC ......... 438/606, 619, 637, 656, 685–688, 694, 438/700, 702, 703, 706, 707, 710, 712, 725, 438/761, 778, 780, 785, 787, 942, 956, 438/FOR. 120, FOR. 132, FOR. 133
See application file for complete search history.

(56) References Cited

U.S. PATENT DOCUMENTS

| 5,399,896 A | * | 3/1995 | Oku .............................. 257/412 |
| 2004/0263290 A1 | * | 12/2004 | Sherrer et al. ................. 333/243 |
| 2008/0246562 A1 | * | 10/2008 | Sherrer ..................... H01P 3/06 333/260 |
| 2013/0015482 A1 | | 1/2013 | Su |
| 2015/0048380 A1 | * | 2/2015 | Koike et al. ..................... 257/76 |

FOREIGN PATENT DOCUMENTS

| TW | 200941746 | 10/2009 |
| TW | 201304208 | 1/2013 |

OTHER PUBLICATIONS

Che-Wei Hsu, Polarized White Light Emitting Diodes, National Taiwan University of science and technology, Dec. 31, 2012.

* cited by examiner

*Primary Examiner* — Kyoung Lee
*Assistant Examiner* — Joannie A Garcia
(74) *Attorney, Agent, or Firm* — Novak Druce Connolly Bove + Quigg LLP

(57) ABSTRACT

A method for making a hollow-structure metal grating is provided. The method includes providing a substrate, forming a patterned mask layer on a surface of the substrate, applying a metal layer with a thickness greater than 10 nanometers on the patterned mask layer, and removing the patterned mask layer by a washing method using organic solvent. The patterned mask layer includes a plurality of first protruding structures and a plurality of first cavities arranged in intervals.

18 Claims, 6 Drawing Sheets

METHOD OF MANUFACTURING HOLLOW-STRUCTURE METAL GRATING

RELATED APPLICATIONS

This application claims all benefits accruing under 35 U.S.C. §119 from China Patent Application No. 201310429909.4 filed on Sep. 22, 2013 in the China Intellectual Property Office, the disclosure of which is incorporated herein by reference.

BACKGROUND

1. Technical Field

The disclosure relates to a method of manufacturing metal grating.

2. Description of Related Art

A sub-wavelength grating is a common optical component in the semiconductor industry. The size of the sub-wavelength grating is similar to or less than the active wavelength of the sub-wavelength grating. It is difficult to make a quartz grating with high density, sub-wavelength, and mark-space ratio. The sub-wavelength grating may be made by electron beam lithography, focused ion beam lithography, deep-ultraviolet lithography, holographic lithography, and nano-imprint lithography.

Currently there is no method for making the sub-wavelength grating with a hollow structure made of metal.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
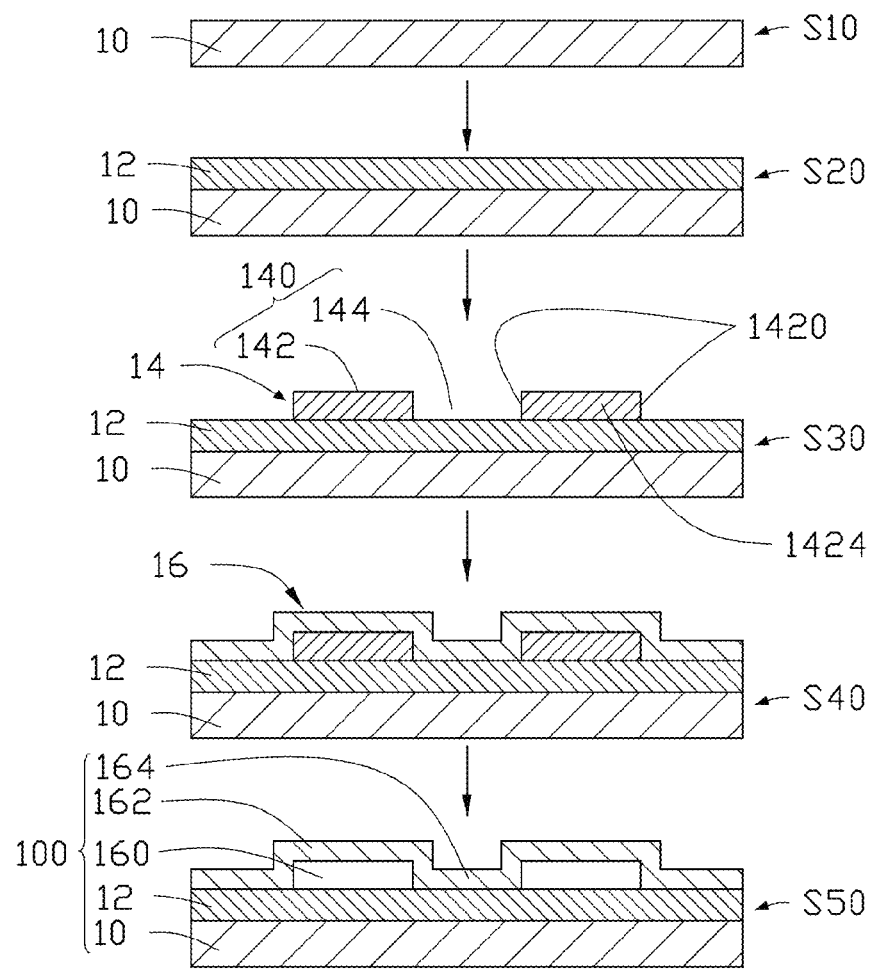
FIG. 1 is a schematic diagram showing one embodiment of a method of manufacturing a hollow-structure metal grating.

Referring to FIG. 1, one embodiment of a method of manufacturing a hollow-structure metal grating 100 comprises the following steps:

S10, providing a substrate 10;

S20, applying a protecting layer 12 on a surface of the substrate 10;

S30, forming a patterned mask layer 140 on a surface of the protecting layer 12, wherein a part of the protecting layer 12 is exposed out of the patterned mask layer 140;

S40, applying a metal layer 16 with a thickness greater than 10 nanometers on the patterned mask layer 140, wherein the patterned mask layer 140 and the part of the protecting layer 12 exposed out of the patterned mask layer 140 is covered by the metal layer 16; and S50, removing the patterned mask layer 140 to obtain the hollow-structure metal grating 100.

In step S10, the substrate 10 can be any shape such as a circular plate and a square plate. The substrate 10 can be a semiconductor substrate or a silicon substrate. The material of the substrate 10 can be gallium nitride (GaN), gallium arsenide (GaAs), sapphire, aluminum oxide, magnesium oxide, silicon, silica, silicon nitride, or silicon carbide. The silica can form a quartz substrate or a glass substrate. In one embodiment, the substrate 10 is a quartz substrate. The material of the substrate 10 can also be a P-type semiconductor or an N-type semiconductor, e.g. a P-type GaN or N-type GaN. Furthermore, the size, the thickness, and the shape of the substrate can be set as desired. The substrate 10 can be cleaned in a clean room to improve the hydrophilicity of the substrate 10.

It is understandable that the step S20 can be an optional step. If the substrate 10 is made of a material not easily corroded, the protecting layer 12 is not necessary. The patterned mask layer 140 can be directly disposed on the surface of the substrate 10.

In step S20, the protecting layer 12 can be made of silicon oxide or titanium oxide. A thickness of the protecting layer 12 can be in a range from about 10 nanometers to about 30 nanometers. The protecting layer 12 has a function of protecting the substrate 10 from eroding when the patterned mask layer 140 is dissolved by a dissolving solution. The protecting layer 12 can be formed by a spinning coating or depositing method.

In step S30, the patterned mask layer 140 can be a positive mask or a negative mask. In one embodiment, the patterned mask layer 140 comprises a plurality of first protruding structures 142 and a plurality of first cavities 144 arranged in intervals. The parts of the surface of the protecting layer 12 can be exposed out of the patterned mask layer 140 through the first cavities 144. The patterned mask layer 140 can be a continuous pattern or a discontinuous pattern. Each of the plurality of first protruding structures 142 can comprise two first sides 1420 opposite to each other, and two opposite second sides 1424 opposite to each other. The two first sides 1420 and the two second sides 1424 are substantially perpendicular to the protecting layer 12. In one embodiment, to obtain the hollow-structure metal grating 100 with a one dimensional structure, the plurality of first protruding structures 142 are strip structures oriented along a same direction, and the first cavities 144 are defined between adjacent protruding structures 142. In another embodiment, to obtain the hollow-structure metal grating 100 with a two dimensional structure, the plurality of first protruding structures 142 are square-shaped bars spaced with each other. A thickness of the plurality of first protruding structures 142 can be in a range from about 50 nanometers to about 250 nanometers. A width of the plurality of first protruding structures 142 can be in a range from about 20 nanometers to about 500 nanometers. A width of the first cavities 144 can be in a range from about 80 nanometers to about 500 nanometers.

The patterned mask layer 140 can be made of ZEP520A which is developed by Zeon Corp of Japan, HSQ (hydrogen silsesquioxane), SOG (Silicon on glass), PMMA (Polymethylmethacrylate), PS (Polystyrene), JEP-520, SAL601 or ARZ720. In one embodiment, the patterned mask layer 140 is made of HSQ, the first protruding structures 142 are strip structures, the first protruding structures 142 and the first cavities 144 are arranged with regular intervals, the width of each first protruding structure 142 is about 100 nm, and the depth of each cavity 144 is about 40 nm.

Figure 2:
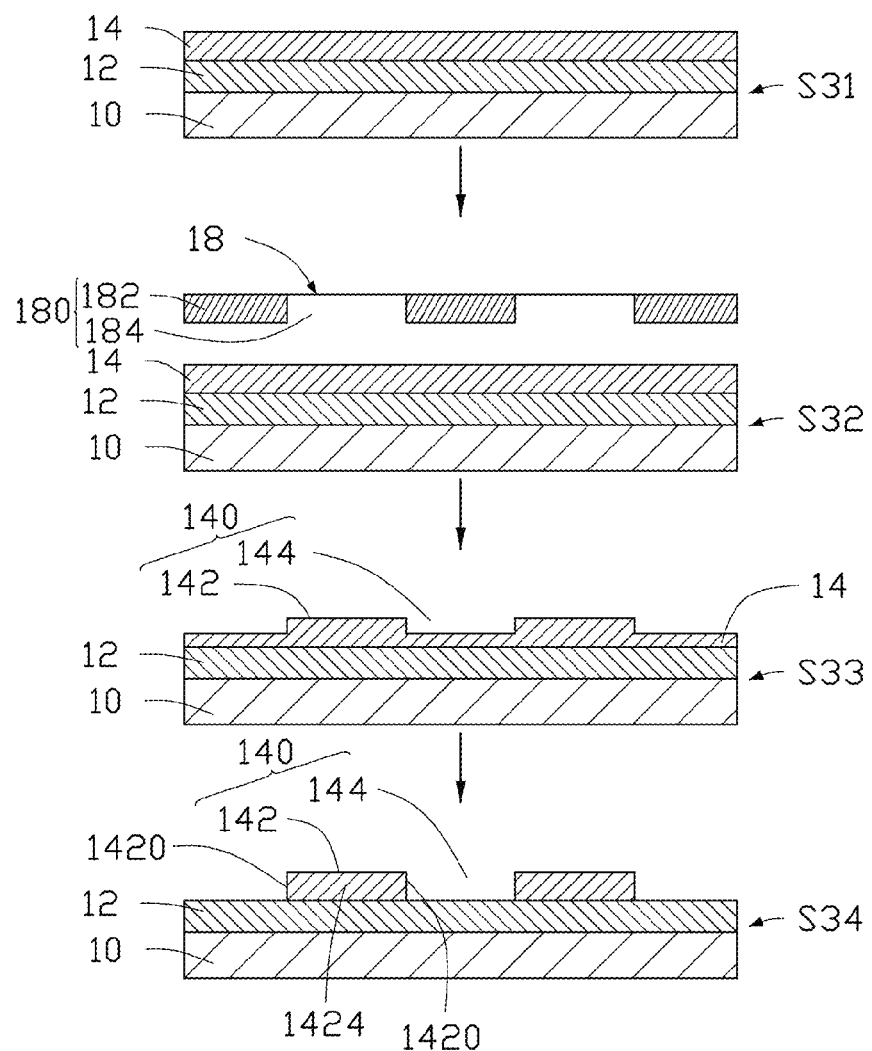
FIG. 2 is a schematic diagram showing the method for making a patterned mask layer used in the method of FIG. 1.

Referring to FIG. 2, the step S30 comprises the sub-steps of:

S31, forming a resist layer 14 on the surface of the protecting layer 12;

S32, providing a master stamp 18 with a first nanopattern 180 defined therein;

S33, pressing the first nanopattern 180 of the master stamp 18 into the resist layer 14 to form the patterned mask layer 140; and S34, removing the resist layer 14 in the bottom of the first cavities 144 to expose a part of the protecting layer 12.

In Step S31, the resist layer 14 is formed on the surface of the protecting layer 12, and the protecting layer 12 is sandwiched between the resist layer 12 and the substrate 10. The resist layer 14 can be made of the same material as the patterned mask layer 140. In one embodiment, the resist layer 14 is made of HSQ resist spin-coated on the protecting layer 12 under high pressure at a speed of about 2500 rounds per minute to about 7000 rounds per minute, for about 0.5 minutes to about 2 minutes. The thickness of the resist layer 14 can be in a range of about 50 nanometers to about 250 nanometers.

In Step S32, the master stamp 18 can be made of rigid materials, such as nickel, silica, silicon, and silicon carbide. The master stamp 18 can also be made of flexible materials, such as PET, PMMA, polystyrene (PS), and polydimethylsiloxane (PDMS). The master stamp 18 can be fabricated through an electron beam lithography method with the first nanopattern 180 formed therein. The first nanopattern 180 can be designed according to the actual application. In one embodiment shown in FIG. 2, the master stamp 18 is made of silica, and the first nanopattern 180 comprises a plurality of first ribs 182 and a plurality of first grooves 184.

In Step S33, the master stamp 18 is first placed on the resist layer 14 with the first nanopattern 180 contacting the resist layer 14. The master stamp 18 is then pressed towards the resist layer 14 at normal temperature. During this process, the first ribs 182 are pressed into the resist layer 14, and some materials of the resist layer 14 are pressed into the first grooves 184. Finally, the master stamp 18 is removed from the resist layer 14 with the first nanopattern 180 to form the patterned mask layer 140 in the resist layer 14. The patterned mask layer 140 in the resist layer 14 comprises the first protruding structures 142 and the first cavities 144. The first protruding structures 142 correspond to the first grooves 184. The first cavities 144 correspond to the first ribs 182.

In one embodiment, the master stamp 18 is pressed towards the resist layer 14 at room temperature in a vacuum environment of about $1 \times 10^{-1}$ millibars to about $1 \times 10^{-5}$ millibars. The pressure applied on the master stamp 18 is about 2 pounds per square foot to about 100 pounds per square foot. The pressure is applied on the master stamp 18 for about 2 minutes to about 30 minutes. There may be remaining material of the resist layer 14 at the bottom of the first cavities 144 after step S33.

In step S34, the remaining material of the resist layer 14 at the bottom of the first cavities 144 is removed by a plasma etching method, and part of the protecting layer 12 is exposed out of the patterned mask layer 140 by the first cavities 144.

In one embodiment, a $CF_4$ reactive plasma etching method can be used to remove the remaining material of the resist layer 14 at the bottom of the first cavities 144. For example, the resist layer 14 with the first protruding structures 142 and the first cavities 144 formed therein can be placed in a $CF_4$ reactive plasma etching system. The $CF_4$ reactive plasma etching system generates $CF_4$ plasma which moves towards the resist layer 14 to etch away the remaining material of the resist layer 14 at the bottom of the first cavities 144, to expose part of the protecting layer 12 out of the first cavities 144.

The power of the $CF_4$ reactive plasma etching system can be in a range of about 10 watts to about 150 watts. The speed of the $CF_4$ plasma can be about 2 standard-state cubic centimeters per minute (sccm) to about 100 sccm. The partial pressure of the $CF_4$ plasma can be about 1 pascal (Pa) to about 15 Pa. The etching time can be about 2 seconds to about 4 minutes.

In step S40, the metal layer 12 can be formed on the patterned mask layer 140 and the parts of the protecting layer 12 exposed out of the patterned mask layer 140. The plurality of first protruding structures 142 and the parts of the protecting layer between the adjacent protruding structures 142 are coated by the metal layer 12. The two first sides 1420 are coated by the metal layer 12 and the two second sides 1424 are exposed. The metal layer 16 between the two adjacent protruding structures 142 form a concave portion 164, and the metal layer 16 coating the protruding structure 142 forms a protruding portion 162. The bottom of the concave portions 164 are attached on the protecting layer 12. The concave portions 164 and the protruding portions 162 are connected with each other. Each of the protruding structures 142 is located between the protecting layer 12 and the protruding portion 164.

The metal layer 16 can be made of gold, silver, copper, or aluminum. To make the metal layer 16 highly self-supporting, the thickness of the metal layer 16 should be greater than 10 nanometers. The thickness of the metal layer 16 can be in a range from about 20 nanometers to about 200 nanometers. In one embodiment, the thickness of the metal layer 16 is about 100 nanometers.

In step S50, a remaining material of the patterned mask layer 140 (such as the protruding structures 142) can be removed by a washing method using organic solvent such as acetone. The two second sides 1424 of each protruding structures 142 are exposed. The organic solvent can dissolve the protruding structures 142 from two second sides 1424 of the protruding structures 142. When the protruding structures 142 are removed by the organic solvent, a space 160 is defined between the protruding portion 164 and the protecting layer 12, thereby obtaining the hollow-structure metal grating 100 is obtained.

Figure 3:
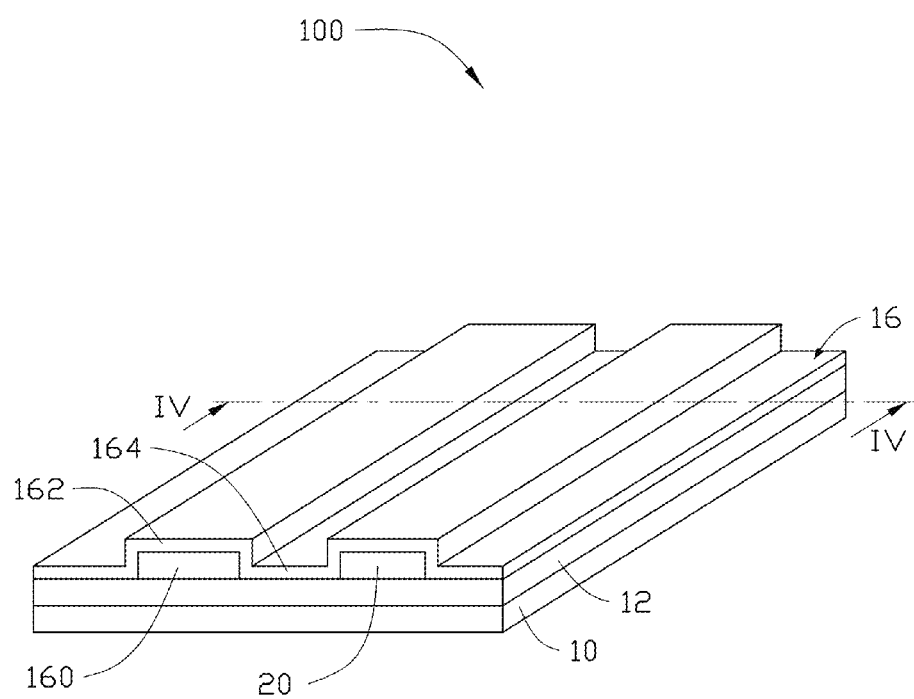
FIG. 3 is a schematic diagram showing the hollow-structure metal grating obtained by the method in FIG. 1.
Figure 4:
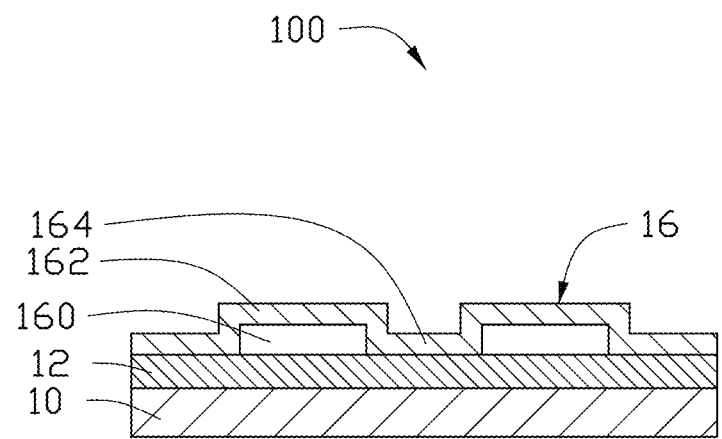
FIG. 4 is a cross-sectional diagram of the hollow-structure metal grating shown in FIG. 3.
Figure 5:
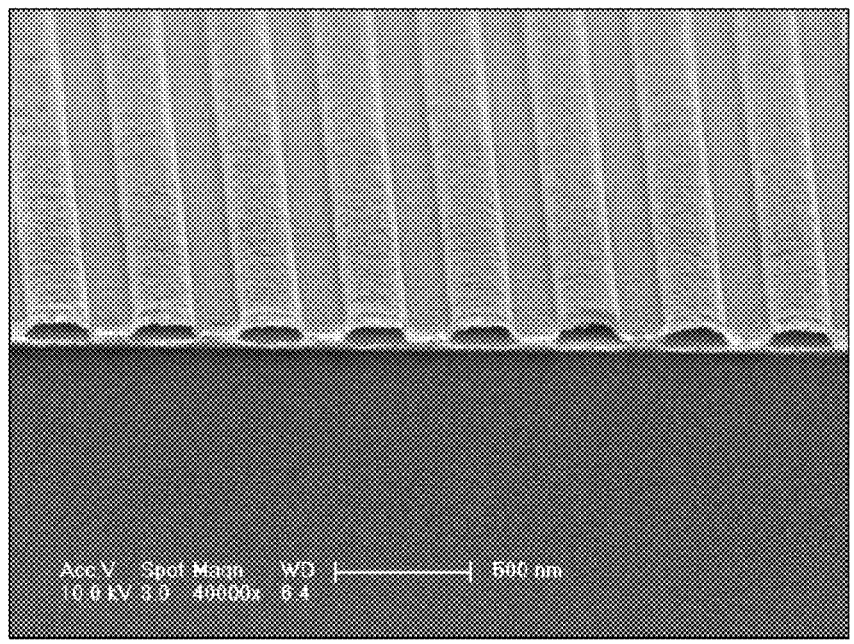
FIG. 5 is an image taken by a scanning electron microscope, of the hollow-structure metal grating by the method in FIG. 1.

Referring to FIG. 3, FIG. 4, and FIG. 5, the hollow-structure metal grating 100 comprises a substrate 10, protecting layer 12, and a metal layer 16. The protecting layer 12 is located on the substrate 10. The metal layer 16 is located on the protecting layer 12. The protecting layer 12 is sandwiched between the metal layer 16 and the protecting layer 12. The metal layer 16 comprises a plurality of protruding portions 162 and a plurality of concave portions 164. The bottom of each of the plurality of concave portions 164 is attached to the protecting layer 12. A space 160 is defined between each of the plurality of protruding portions 162 and the protecting layer 12.

The protruding portions 162 can be equally spaced, and concave portions 164 can be equally spaced. Each of the protruding portions 162 has the same size and shape. In addition, the protruding portions 162 and the concave portions 164 have the same extension direction. Each of the protruding portions 162 has two opposite sidewalls, which are substantially perpendicular to the surface of the substrate 110. In addition, the protruding portions 162 and the concave portions 164 are integrated to form a whole structure. A width between the protruding portions 162 can be in a range from about 80 nanometers to about 500 nanometers. A width of the protruding portions 162 can be in a range from about 70 nanometers to about 400 nanometers. A thickness of the metal layer 16 can be in a range from 20 nanometers to about 200 nanometers.

In one embodiment, the plurality of protruding portions 162 and the concave portions 164 are strip shaped structures, and are arranged at regular intervals, the width of each protruding portion 162 is about 100 nm, and the height of the protruding portions 162 is about 40 nm.

Figure 6:
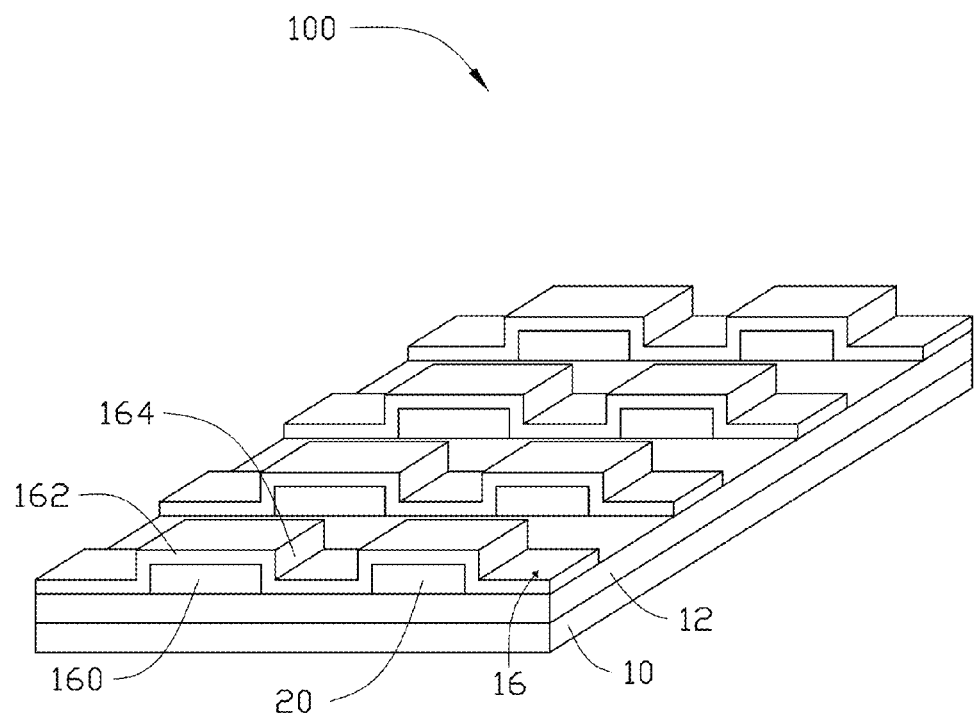
FIG. 6 is a schematic diagram showing a hollow-structure metal grating obtained by the method in FIG. 1.

Referring to FIG. 6, in one embodiment, the hollow-structure metal grating 100 comprises a plurality of metal layers 16 spaced and substantially parallel to each other. Each metal layer 16 comprises a plurality of protruding portions 162 and a plurality of concave portions 164. The bottom of the plurality of concave portions 164 are attached to the protecting layer 12. A space 160 is defined between each of the plurality of protruding portions 162 and the protecting layer 12.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A method of manufacturing a hollow-structure metal grating, the method comprising:
    S10, providing a substrate;
    S20, applying a protecting layer directly attached to a surface of the substrate;
    S30, forming a patterned mask layer a surface of the protecting layer, wherein a part of the protecting layer is exposed out of the patterned mask layer, wherein the step S30 comprises the following steps:
    S31, forming a resist layer on the surface of the protecting layer, wherein the resist layer is made of a same material as the patterned mask layer;
    S32, providing a master stamp with a first nanopattern defined therein;
    S33, pressing the first nanopattern of the master stamp into the resist layer to form the patterned mask layer, wherein the patterned mask layer comprises a plurality of first protruding structures and a plurality of first cavities alternately arranged in intervals; and
    S34, removing the resist layer in a bottom of the first cavities to expose the part of the protecting layer;
    S40, applying a metal layer with a thickness greater than 10 nanometers on the patterned mask layer, wherein the patterned mask layer and the part of the protecting layer exposed out of the patterned mask layer are covered by the metal layer; and
    S50, removing the patterned mask layer to obtain the hollow-structure metal grating.

2. The manufacturing method of claim 1, wherein in the step S10, a material of the substrate is gallium nitride (GaN), gallium arsenide (GaAs), sapphire, aluminum oxide, magnesium oxide, silicon, silica, silicon nitride, or silicon carbide.

3. The manufacturing method of claim 1, wherein the protecting layer is made of silicon oxide or titanium oxide.

4. The manufacturing method of claim 1, wherein each of the plurality of first protruding structures comprises two first sides opposite to each other, and two second sides opposite to each other.

5. The manufacturing method of claim 4, wherein in the step S40, the two first sides of each of the plurality of first protruding structures are coated by the metal layer, and the second sides of each of the plurality of first protruding structures are exposed.

6. The manufacturing method of claim 5, wherein in the step S40, the metal layer is formed by electron beam evaporation or ion beam sputtering.

7. The manufacturing method of claim 6, wherein the metal layer is made of gold, silver, copper, or aluminum.

8. The manufacturing method of claim 6, wherein a thickness of the metal layer is in a range from about 20 nanometers to about 200 nanometers.

9. The manufacturing method of claim 5, wherein the patterned mask layer is made of ZEP520A, SOG, PMMA, PS, JEP-520, SAL601, or ARZ720.

10. The manufacturing method of claim 5, wherein the master stamp is made of silica, and the first nanopattern comprises a plurality of first ribs and a plurality of first grooves.

11. The manufacturing method of claim 10, wherein in the step S33, the first protruding structures correspond to the plurality of first grooves, and the plurality of first cavities correspond to the plurality of first ribs.

12. The manufacturing method of claim 5, wherein in the step S50, the patterned mask layer is removed by a washing method using organic solvent.

13. The manufacturing method of claim 12, wherein in the step S50, the organic solvent dissolves the protruding structures from the two second sides of the protruding structures.

14. A method of manufacturing a hollow-structure metal grating, the method comprising:
    S10, providing a substrate;
    S20, applying a protecting layer directly attached to a surface of the substrate;
    S30, forming a patterned mask layer on a surface of the protecting layer, wherein a part of the protecting layer is exposed out of the patterned mask layer, wherein the patterned mask layer comprises a plurality of first protruding structures and a plurality of first cavities arranged in intervals, each of the plurality of first protruding structures comprises two first sides opposite to each other, and two opposite second sides are opposite to each other;
    S40, applying a metal layer with a thickness greater than 10 nanometers on the patterned mask layer, wherein the patterned mask layer and a part of the protecting layer exposed out of the patterned mask layer are covered by the metal layer, the two first sides are coated by the metal layer, and the two second sides are exposed; and
    S50, removing the patterned mask layer by a washing method using organic solvent to obtain the hollow-structure metal grating.

15. The manufacturing method of claim 14, wherein the metal layer is made of gold, silver, copper, or aluminum.

16. The manufacturing method of claim 15, wherein a thickness of the metal layer is in a range from about 20 nanometers to about 200 nanometers.

17. The manufacturing method of claim 14, wherein the patterned mask layer is made of ZEP520A, SOG, PMMA, PS, JEP-520, SAL601, or ARZ720.

18. The manufacturing method of claim 14, wherein in the step S30, the metal layer between the two adjacent protruding structures form a concave portion, and the metal layer coating the protruding structure forms a protruding portion.

* * * * *